US012731519B2

(12) United States Patent
Kim et al.

(10) Patent No.: US 12,731,519 B2
(45) Date of Patent: Sep. 8, 2026

(54) DATA DRIVER AND CONTROL METHOD THEREOF

(71) Applicant: LX SEMICON CO., LTD., Daejeon (KR)

(72) Inventors: Won Kim, Daejeon (KR); Yong Hwan Moon, Daejeon (KR); Se Hong Oh, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/790,485

(22) Filed: Jul. 31, 2024

(65) Prior Publication Data

US 2025/0046228 A1 Feb. 6, 2025

(30) Foreign Application Priority Data

Aug. 2, 2023 (KR) ........................ 10-2023-0101243
Jun. 24, 2024 (KR) ........................ 10-2024-0081983

(51) Int. Cl.
*G09G 3/20* (2006.01)

(52) U.S. Cl.
CPC ......... *G09G 3/2074* (2013.01); *G09G 3/2092* (2013.01); *G09G 2310/027* (2013.01); *G09G 2310/0286* (2013.01); *G09G 2330/021* (2013.01)

(58) Field of Classification Search
CPC ............... G09G 3/2074; G09G 3/2092; G09G 2310/027; G09G 2310/0286; G09G 2330/021; G09G 2310/0291; G09G 2360/16; G09G 3/3688; G09G 3/3291; G09G 3/30; G09G 3/3241; G09G 3/3275; G09G 3/3685; G09G 2320/02
See application file for complete search history.

(56) References Cited

U.S. PATENT DOCUMENTS

| | | | | |
|---|---|---|---|---|
| 8,085,234 | B2 | 12/2011 | Nishimura et al. | |
| 10,878,760 | B2 | 12/2020 | Kim et al. | |
| 11,081,036 | B1 * | 8/2021 | Wang | H03K 5/24 |
| 2008/0266276 | A1 * | 10/2008 | Choi | G09G 3/3685 345/204 |
| 2010/0079437 | A1 * | 4/2010 | Tonomura | G09G 3/3688 345/92 |
| 2010/0302264 | A1 * | 12/2010 | Segawa | G06T 3/00 345/530 |
| 2011/0141077 | A1 * | 6/2011 | Cho | G09G 3/3426 345/207 |
| 2012/0280965 | A1 * | 11/2012 | Lee | G09G 3/3696 345/212 |
| 2013/0307838 | A1 * | 11/2013 | Kim | G09G 5/001 345/212 |

(Continued)

FOREIGN PATENT DOCUMENTS

KR 10-2021-0017581 A 2/2021

*Primary Examiner* — Jose R Soto Lopez
(74) *Attorney, Agent, or Firm* — ROTHWELL, FIGG, ERNST & MANBECK, P.C.

(57) ABSTRACT

The present disclosure relates to a data driver and a control method thereof, wherein a position of pixels to which pixel data is written and the amount of change in grayscale of the pixel data are judged, and a bias current to an output buffer from which a data voltage corresponding to the pixel data is output is varied according to the position of pixels and the amount of change in grayscale of the pixel data.

19 Claims, 6 Drawing Sheets

(56) References Cited

U.S. PATENT DOCUMENTS

| | | | | |
|---|---|---|---|---|
| 2014/0300937 | A1* | 10/2014 | Choe | H04N 1/0282 358/480 |
| 2016/0155384 | A1* | 6/2016 | Kim | G09G 3/3258 345/82 |
| 2017/0186395 | A1* | 6/2017 | Jeon | G09G 3/3677 |
| 2018/0374427 | A1* | 12/2018 | Kuei | G09G 3/3688 |
| 2019/0244579 | A1* | 8/2019 | Oh | G09G 3/3291 |
| 2021/0020087 | A1* | 1/2021 | Kim | G09G 3/035 |
| 2021/0142767 | A1* | 5/2021 | Mo | G09G 5/397 |
| 2021/0201743 | A1* | 7/2021 | Park | G09G 3/2003 |
| 2022/0037418 | A1* | 2/2022 | Han | H10K 59/353 |
| 2022/0075979 | A1* | 3/2022 | Han | G06V 40/1318 |
| 2022/0115456 | A1* | 4/2022 | Oh | H10K 59/352 |
| 2022/0230578 | A1* | 7/2022 | Pyun | G09G 3/2011 |
| 2023/0113898 | A1* | 4/2023 | Kim | G09G 3/2092 345/211 |
| 2023/0206801 | A1* | 6/2023 | Cheng | G09G 3/20 345/212 |

* cited by examiner

| INPUT | | OUTPUT | | | |
|---|---|---|---|---|---|
| A | B | $D_1$ | $D_2$ | $D_3$ | $D_4$ |
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

DATA DRIVER AND CONTROL METHOD THEREOF

CROSS-REFERENCE TO RELATED APPLICATION

This application claims priority to and the benefits of Korean Patent Application No. 10-2023-0101243, filed on Aug. 2, 2023, and Korean Patent Application No. 10-2024-0081983, filed on Jun. 24, 2024, the disclosures of which are incorporated herein by reference in their entirety.

BACKGROUND

Field

The present disclosure relates to a data driver and a control method of the same.

Description of Related Art

Display devices include a data driver that supplies data voltages to pixels on a display panel. Various studies are being conducted to reduce the power consumption of the data driver. There is a need for a way to further reduce the power consumption without deteriorating the image quality of the display devices.

SUMMARY

An object of the present disclosure is to solve the above-described necessity and/or problems.

The present disclosure provides a data driver and a control method of the same that are capable of reducing power consumption without deteriorating the image quality of a display device.

The problem to be solved by the present disclosure is not limited to those mentioned above, and other problems not mentioned will be clearly understood by those skilled in the art from the following description.

A data driver according to one embodiment of the present disclosure includes: an output buffer configured to output a data voltage corresponding to pixel data; and a bias current coordinator configured to coordinate a bias current applied to the output buffer according to a position of pixels to which the data voltage is to be charged, and to coordinate the bias current according to a swing width of the data voltage.

The data driver may further include a data comparator configured to compare a grayscale difference of the pixel data that is varied with time.

The bias current coordinator may vary the bias current based on grayscale difference data input from the data comparator.

A data driver according to another embodiment of the present disclosure includes: a first latch array configured to latch pixel data; a second latch array configured to latch the pixel data output from the first latch array; a digital-to-analog converter configured to convert the pixel data output from the second latch array to a data voltage; an output buffer configured to output the data voltage from the digital-to-analog converter; a data comparator connected to the first latch array and the second latch array and configured to compare first pixel data stored in the first latch array and second pixel data stored in the second latch array; and a bias current coordinator connected between the data comparator and the output buffer and configured to vary a bias current applied to the output buffer.

According to embodiments of the present disclosure, the display driver may vary the bias current applied to the output buffer of the data driver according to the position of the pixels and also vary the bias current according to a change in the swing width of the data voltage based on the grayscale difference of the pixel data, thereby improving the uniformity of image quality across the screen and minimizing the power consumption.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF EXEMPLARY EMBODIMENTS

Figure 1:
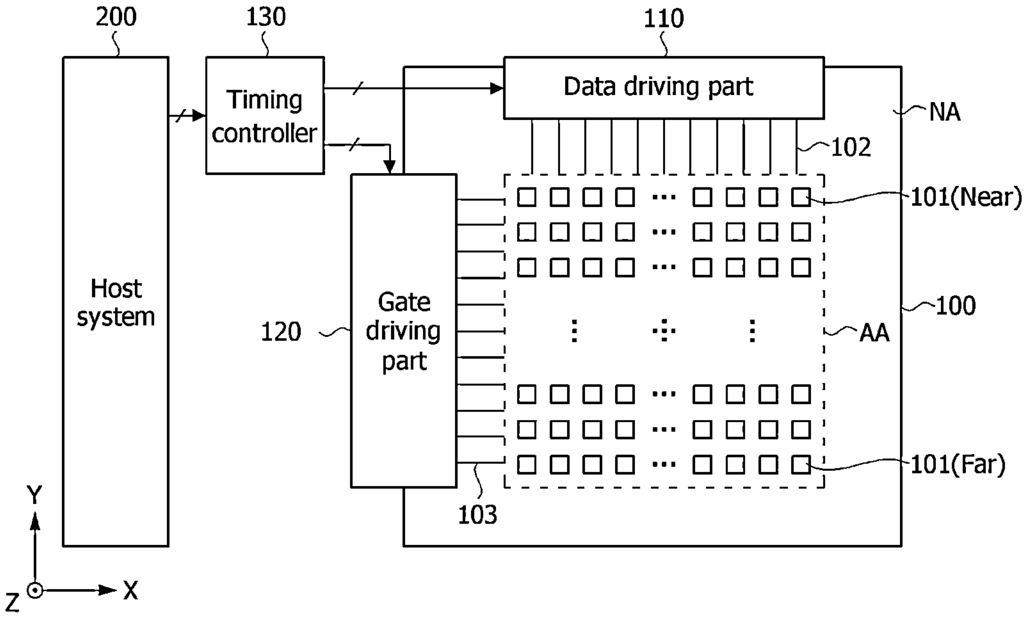
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor, since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. In the following description, a source and a drain of a transistor will be referred to as a first electrode and a second electrode.

In the following description of the embodiments, pixels located at a greater distance from a data driving part will be referred to as "Far pixels" and pixels located closer to the data driving part will be referred to as "near pixels". Near pixel may be interpreted as a first pixel and Far pixel as a second pixel.

Hereinafter, various embodiments of the present disclosure will be described in detail with reference to the accompanying drawings.

FIG. 1 is a block diagram illustrating a display device according to one embodiment of the present disclosure.

Referring to FIG. 1, a display device according to an embodiment of the present disclosure includes a display panel 100 and a display panel driving circuit for writing source data to pixels of the display panel 100.

A substrate of the display panel 100 may be, but is not limited to, a plastic substrate, a thin glass substrate, or a metal substrate. The display panel 100 may be, but is not limited to, a panel having a rectangular structure with a length in a first direction (X), a width in a second direction (Y), and a thickness in a third direction (Z).

In the case of a liquid crystal display device, a backlight unit (BLU) may be disposed below the display panel 100. In the case of a self-emitting display device such as an electroluminescent display device, a separate light source such as a backlight unit is not required.

A display area AA of the display panel 100 includes a pixel array for displaying an input image thereon. The pixel array includes a plurality of data lines 102, a plurality of gate lines 103 intersecting the data lines 102, and the pixels 101 connected to the data lines 102 and the gate lines 103.

The pixel array includes a plurality of pixel lines. Each of the pixel lines includes one line of pixels disposed in the pixel array of the display panel 100 along the first direction X. The pixels located on the one line of pixels share the gate line 103. One column of sub-pixels disposed along the second direction Y share the same data line 102. One horizontal period may be a time obtained by dividing one frame period by the total number of pixel lines.

Each of the pixels 101 may be divided into a red sub-pixel, a green sub-pixel, and a blue sub-pixel for color implementation. Each of the pixels may further include a white sub-pixel. In a liquid crystal display device, the pixels include a liquid crystal cell. In electroluminescent display devices, the pixels may include light-emitting elements such as organic light-emitting diodes (OLED). Each of the sub-pixels includes a pixel circuit for driving a liquid crystal cell or a light-emitting element.

The display panel driving circuit writes pixel data (or source data) of an input image to the pixels of the display panel 100 under the control of a timing controller 130. The display panel driving circuit includes a data driving part 110 that converts pixel data to a data voltage, and a gate driving part 120.

The display panel driving circuit may further include a touch sensor driving part for driving touch sensors. The touch sensor driving part is omitted from FIG. 1. The data driving part 110 and the touch sensor driving part may be integrated together in an integrated circuit (IC) for the data driver.

The data driving part 110 receives the pixel data of the input image provided as a digital signal from the timing controller 130 and outputs the data voltage. The data driving part 110 may be interpreted as a data driver. The data driving part 110 may convert the input digital signal to a grayscale voltage (or a gamma compensation voltage) using a digital-to-analog converter (hereinafter referred to as DAC) and output the data voltage. For a liquid crystal display, the data driving part 110 may periodically invert and output the polarity of the data voltage in units of one horizontal period or two horizontal periods under the control of the timing controller 130.

The data driving part 110 may judge the position of pixels to which the pixel data is written, the amount of change in grayscale (or grayscale difference) of the pixel data, and vary the bias current to the output buffer based on the position of pixels and the amount of change in grayscale of the pixel data.

A circuit of the gate driving part 120 may be disposed in a non-display area NA outside the display area AA in the display panel 100 or at least a portion thereof may be disposed in the display area AA. The gate driving part 120 may be integrated into a separate IC for a gate driver and electrically connected to the gate lines 103 of the display panel 100.

The gate driving part 120 sequentially outputs a gate pulse (or a scan pulse) to the gate lines 103 under the control of the timing controller 130. The gate driving part 120 may sequentially supply the gate pulse to the gate lines 103 by shifting the gate pulse using a shift register.

The display device may further include a power supply omitted from the drawings. The power supply receives an input voltage applied from the host system 200 and outputs a constant voltage required to drive the pixels 101 of the display panel 100 and the display panel driving circuit.

The timing controller 130 receives the pixel data of the input image and a timing signal synchronized with the pixel data from the external host system 200. The timing signal may include a vertical synchronization signal Vsync, a horizontal synchronization signal Hsync, a data enable signal DE, and a main clock. A vertical period and a horizontal period may be known by a method of counting the data enable signal DE, and thus the vertical synchronization signal Vsync and the horizontal synchronization signal Hsync may be omitted. The vertical synchronization signal Vsync has a cycle of one frame period. The horizontal synchronization signal Hsync and the data enable signal DE have a cycle of one horizontal period (1H). The timing controller 130 may control the operation timing of the display panel driving circuits 110 and 120 based on the timing signals Vsync, Hsync, and DE received from the host system 200.

The host system 200 may scale an image signal from a video source to match the resolution of the display panel 100, and may transmit it to the timing controller 130 together with the timing control signal.

Figure 2:
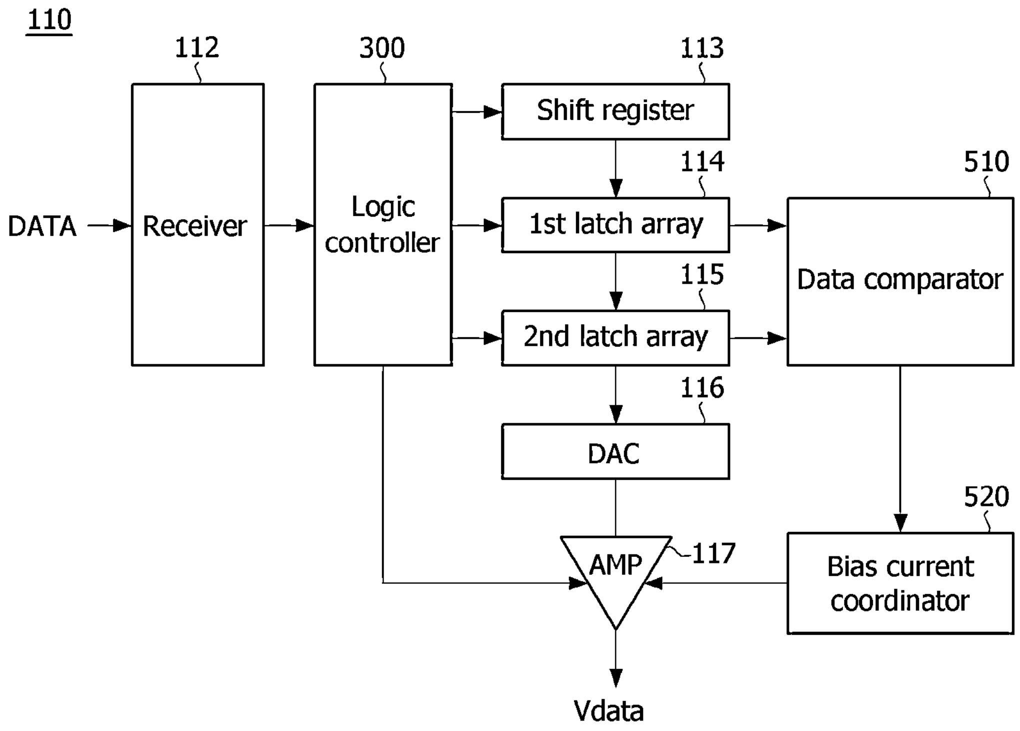
FIG. 2 is a block diagram illustrating the configuration of a data driving part according to one embodiment of the present disclosure.

FIG. 2 is a block diagram illustrating the configuration of the data driving part according to one embodiment of the present disclosure.

Referring to FIG. 2, the data driving part 110 may include a receiver 112, a logic controller 300, a shift register 113, a first latch array 114, a second latch array 115, a digital-to-analog converter (DAC) 116, an output buffer 117, a data comparator 510, and a bias current coordinator 520.

The timing controller 130 may convert clock and data to a differential signal of a low voltage and transmit the differential signal to the data driving part 110 through a high-speed serial interface. The receiver 112 receives data DATA transmitted in series from the timing controller 130. The receiver 112 restores the clock from the data DATA, samples the control data and the pixel data of the input image from the data DATA using the restored clock, and provides them to the logic controller 300.

The logic controller 300 may transmit the pixel data of the input image supplied from the receiver 112 to the shift register 113, and may control the output timing of the first and second latch arrays 114 and 115 using the restored clock and the control data. The shift register 113, the first latch array 114, and the second latch array 115 convert serial mode data to parallel mode data. The shift register 113 sequentially outputs the pixel data input from the logic controller 300 to the latches in the first latch array 114. The first latch array 114 sequentially samples the pixel data of the input image input through the shift register 113 in response to the clock input from the logic controller 300, and when the pixel data has been latched in all of the latches, simultaneously outputs the latched pixel data to the latches in the second latch array 115. The second latch array 115 latches the pixel data simultaneously received from the latches in the first latch array 114 and simultaneously outputs the latched pixel data to the DAC 116 in response to an output enable signal from the logic controller 300.

The DAC 116 converts the pixel data input as a digital signal from the second latch array 115 into a gamma compensation voltage to output a data voltage having a voltage level corresponding to a grayscale value of the pixel data. The data voltage output from the DAC 116 is output through the output buffer 117. The output buffer 117 may output the data voltage through a buffer circuit 74 shown in FIG. 7. The output buffer 117 may include, but is not limited to, a current coordinator 526 and the buffer circuitry 74 shown in FIG. 7.

A level shifter, which is omitted in the drawing, may be disposed between the second latch array 115 and the DAC 116. The level shifter may shift the voltage level of the output data from the second latch array 115 to an operable voltage for the DAC 116. A multiplexer may be connected to an output terminal of the output buffer 117. The multiplexer may selectively connect the data voltage output through the output buffer 117 to the data line. The output terminals of the data driving part 110 may be controlled to a high impedance state by the multiplexer.

The data comparator 510 may compare the change in the grayscale value on a time axis with respect to the pixel data input to the data driving part 110 to judge the grayscale difference (or the amount of change in grayscale) between the pixel data. For example, the data comparator 510 may compare the pixel data to be sequentially written to an (N)th pixel line selected by a gate signal in an (N)th horizontal period (where N is a natural number) and an (N+1)th pixel line selected by a gate signal in an (N+1)th horizontal period to judge the grayscale difference (or the amount of change in grayscale) between the pixel data.

The data comparator 510 may compare first pixel data of the (N+1)th pixel line (where N is a natural number) stored in the first latch array 114 with second pixel data of the (N)th pixel line stored in the second latch array 115. The data comparator 510 outputs data on the grayscale difference indicative of the amount of change in grayscale between the first and second pixel data and the swing width of the data voltage. The data comparator 510 may compare most significant bits (MSB) of the pixel data, for example, two most significant bits, when comparing the first pixel data and the second pixel data. The data voltage of the first pixel data and the data voltage of the second pixel data may be applied sequentially to the same data line through the same output channel. Accordingly, when a grayscale difference occurs between the first pixel data and the second pixel data, the data voltage applied to the data line is changed to generate a swing width. The swing width of the data voltage may increase in proportion to the grayscale difference of the pixel data.

The (N)th pixel line includes a plurality of pixels to which the pixel data is written in the (N)th horizontal period. The (N+1)th pixel line includes a plurality of pixels to which the pixel data is written in the (N+1)th horizontal period. After a data voltage corresponding to the data of the (N)th pixel line is applied to the data lines, a data voltage corresponding to the data of the (N+1)th pixel line is applied. As the grayscale difference between the pixel data of the (N)th pixel line and the (N+1)th pixel line increases, the swing width of the data voltage applied to the data line increases.

The bias current coordinator 520 may vary the bias current applied to the output buffer 117 according to the distance between the data driving part 110 and the pixels, and may vary the bias current to the output buffer 117 according to the grayscale difference of the pixel data in response to the grayscale difference data input from the data comparator 510. The higher the bias current, the higher the slew rate of the data voltage, while the lower the bias current, the lower the slew rate of the data voltage. When the slew rate of the data voltage is low, the current flowing in the data driving part 110 is reduced, which may reduce power consumption and also reduce the amount of heat generated.

The bias current coordinator 520 or the logic controller 300 may judge the position of the pixel to which the pixel data is written, based on counting the timing signals received by the receiver 112, such as a clock, or counting the grayscale difference data input from the data comparator 510. The bias current coordinator 520 may vary the bias current Ib applied to the output buffer 117 according to the distance between the data driving part 110 and the pixel.

The bias current coordinator 520 may lower the bias current applied to the output buffer 117 when the data voltage to be charged to a near pixel is output through the output buffer 117 than the bias current applied to the output buffer 117 when the data voltage to be charged to a far pixel is output through the output buffer 117. As a result, the current flowing in the data driving part 110 is lowered during a scanning period in which the pixel data is written to the near pixel, so that the power consumption may be reduced and the amount of heat generated may also be reduced.

Far pixels having a large RC delay and a large IR drop have a lower charge amount of the data voltage, whereas near pixels having a small RC delay and a small IR drop have a higher charge amount of the data voltage. When a difference in the charging rate of the data voltage of the pixels 101 occurs according to the position to the display panel 100, the luminance uniformity of the screen may be lowered. The bias current coordinator 520 may equally control the charging rate of the data voltage in all of the pixels and equally control the charging rate of the data voltage in all of the pixels at the same gray scale difference by coordinating the bias current applied to the output buffer 117 to be low for the near pixels and coordinating the bias current applied to the output buffer 117 to be low when the grayscale difference of the pixel data is relatively small, thereby improving the image quality and reducing the power consumption.

Figure 3:
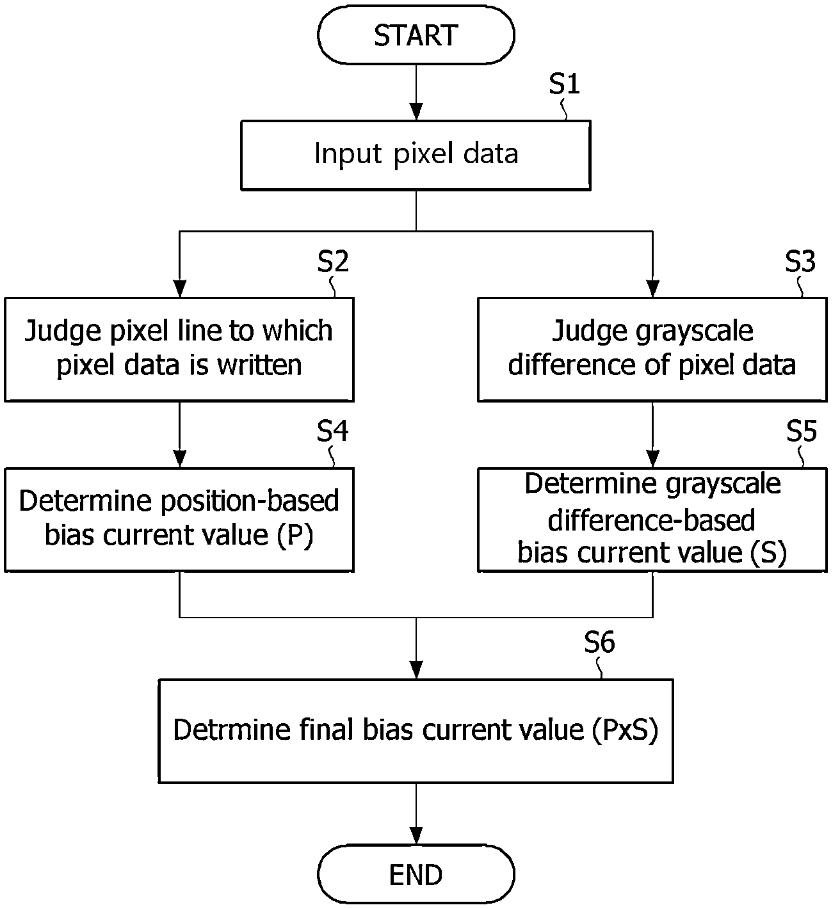
FIG. 3 is a flow chart illustrating a bias current control method of a data driving part according to one embodiment of the present disclosure.

FIG. 3 is a flowchart illustrating a bias current control method of the data driver according to one embodiment of the present disclosure. The bias current control method may be performed by the data comparator 510, the bias current coordinator 520, and the output buffer 117.

Referring to FIG. 3, when pixel data is input to the data driving part 110 (S1), the data driving part 110 judges the position of the pixels to which the pixel data is written in a unit of a pixel line by using the logic controller 300 or the bias current coordinator 520 (S2), and judges the grayscale difference of the pixel data by using the data comparator 510 (S3).

The bias current coordinator 520 may determine the position-based bias current value P according to the position of the pixels in units of pixel lines or pixel blocks, regardless of the grayscale difference of the pixel data (S4). The bias current coordinator 520 determines the grayscale difference-based bias current value S based on the grayscale difference of the pixel data, in a unit of a pixel line or a pixel block (S5). The grayscale difference-based bias current value S may be varied according to the grayscale difference data output from the data comparator 510. The position-based bias current value P may be interpreted as a first current value and the grayscale difference-based bias current value S may be interpreted as a second current value. A pixel block may include two or more pixel lines. The grayscale difference-based bias current value S may be interpreted as a scale ratio, an increase/decrease ratio, a coordinating coefficient, or the like.

The bias current coordinator 520 may determine a final bias current value by multiplying the position-based bias current value P by the grayscale difference-based bias current value S (S6). For example, assuming that a default current value is 100%, if it is determined that P=50% and S=50%, then the bias current to be applied to the output buffer 117 will be coordinated to as follows: 100%*50%*50%=25%.

The default current value may be determined according to power option data PWRC transmitted from the timing controller 130 to the data driving part 110, and may be applied to all of the pixels at the same value, regardless of the position of pixels or the grayscale difference. The power option data PWRC may be encoded in the control data transmitted to the data driving part 110. The default current value may be varied by a logic value of the power option data PWRC. For example, assuming that the default current value is reduced to 50% by the power option data PWRC, if P=50% and S=50%, then the bias current applied to the output buffer 117 is lowered to as follows: 50%*50%*50%=12.5%. The logic controller 300 may set the bias current in response to the power option data PWRC in a unit of a frame period.

The bias current to the output buffer 117 may be varied with the position between the data driving part 110 and the pixels, and may also be varied with the grayscale difference of the pixel data. As the distance from the data driving part 110 to the position of the pixel is closer and the grayscale difference of the pixel data is smaller, the bias current to the buffer 117 is reduced, thereby improving the power consumption reduction effect.

Figure 4:
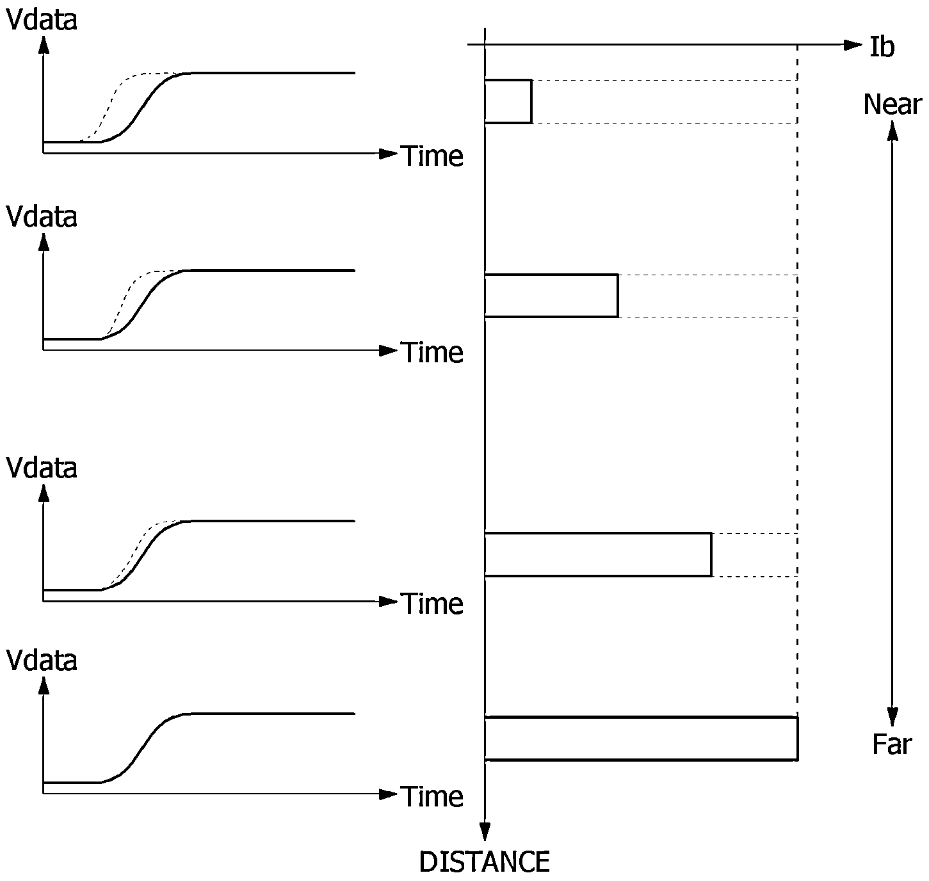
FIG. 4 is a diagram illustrating an example of a method for controlling a pixel position-based bias current according to one embodiment of the present disclosure.

FIG. 4 is a diagram illustrating an example of a method for controlling the pixel position-based bias current according to one embodiment of the present disclosure. In FIG. 4, the graphs on the left is waveforms of a data voltage when the data voltage having the same grayscale difference is applied to pixels at different distances from the data driving part 110. In the graphs on the left, the horizontal axis represents the time and the vertical axis represents the data voltage. In FIG. 4, the graph on the right represents a bias current Ib that is varied with the position of the pixels at different distances from the data driving part 110. In the graph on the right, the horizontal axis represents a bias current and the vertical axis represents a distance between the data driving part 110 and the pixels.

Referring to FIG. 4, when the bias current to the output buffer is the same for all of the pixels regardless of their locations, the data voltage charged in the near pixels reaches the target voltage quickly due to the high slew rate of the data voltage applied to the near pixels, as shown by the dotted line, while the data voltage charged in the far pixels reaches the target voltage late due to the relatively low slew rate of the data voltage applied to the far pixels. In general, the data voltage applied to the pixels in a last pixel line farthest from the data driving part 110 has the lowest slew rate.

The bias current coordinator 520 coordinates the slew rate to the same or similar level for all of the pixels on the display panel 100, as shown in the solid line, by reducing the bias current applied to the output buffer 117 as the distance between the data driving part 110 and the pixel 101 decreases.

The near pixels of the first pixel line closest to the data driving part 110 may be scanned by the gate signal during a first horizontal period to charge the data voltage of the pixel data. The far pixels of the (M)th pixel line (where M is a natural number greater than or equal to 2) farthest from the data driving part 110 may be scanned by the gate signal during an (M)th horizontal period to charge the data voltage of the pixel data. The bias current coordinator 520 may set the bias current to be applied to the output buffer to a low value during the first horizontal period and increase the bias current during the (M)th horizontal period. By this pixel position-based bias current control method, the bias current applied to the output buffer 117 may be gradually or step-wise increased as time elapses during one frame period. As a result, as the distance between the data driving part 110 and the pixel decreases, the bias current applied to the output buffer 117 may be reduced, and therefore the slew rate may be controlled to the same or similar level for all of the pixels on the display panel 100, as shown in the solid line.

The luminance uniformity of the image reproduced on the display panel 100 is improved because the slew rate of the data voltage is controlled to the same or similar level as that of the pixel having the lowest slew rate of the data voltage for all of the pixels. In addition, the bias current to the output buffer 117 is lowered when the data voltage to be charged to the near pixels is output, which lowers the power consumption and the heat generation of the data driving part 110.

Figure 5:
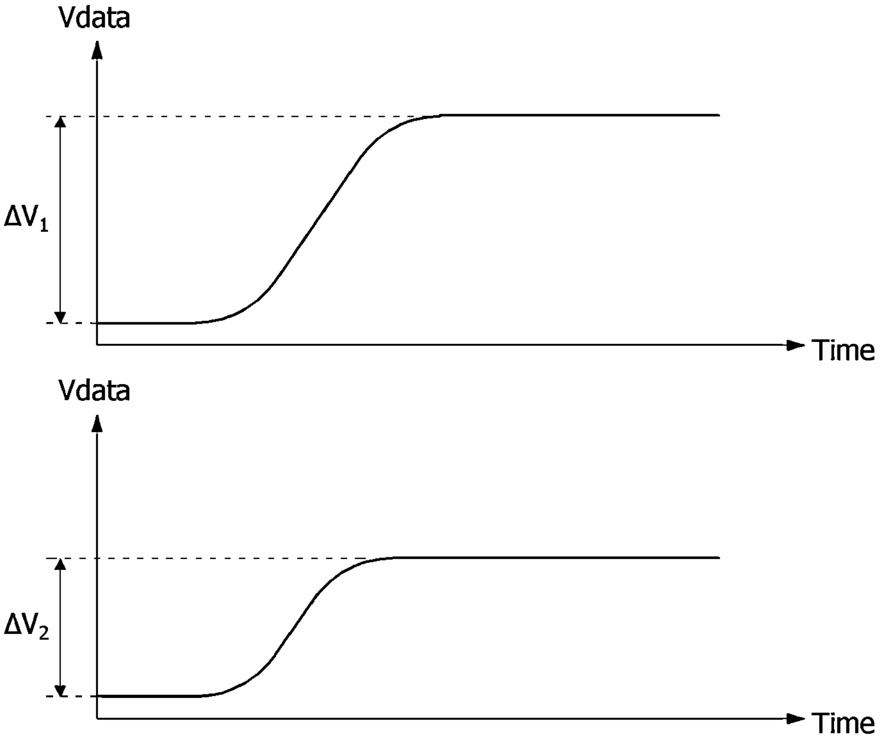
FIG. 5 is a diagram illustrating an example of a method for controlling a pixel data grayscale difference-based bias current according to one embodiment of the present disclosure.

FIG. 5 is a diagram illustrating an example of a method for controlling a pixel data grayscale difference-based bias current according to one embodiment of the present disclosure. In FIG. 5, the graph at the top represents a data voltage Vdata when pixel data has a large grayscale difference ΔV1, and the graph at the bottom represents a data voltage Vdata when pixel data has a small grayscale difference ΔV2.

Referring to FIG. 5, the bias current applied to the output buffer 117 becomes smaller when the pixel data has a relatively small change in grayscale value than when the pixel data has a large change in grayscale value, and when the pixel data on the time axis has a smaller grayscale value than a previous grayscale value. Accordingly, when the grayscale value of the pixel data is small, the bias current may become smaller and the slew rate of the data voltage output from the data driving part 110 may become lower.

When the grayscale difference ΔV1 of the pixel data is large, the swing width of the data voltage Vdata charged to the pixels increases. When the swing width of the data voltage Vdata is large, the slew rate of the data voltage Vdata charged to the pixels may be increased by increasing the bias current flowing to the output buffer 117. On the other hand, although the bias current flowing in the output buffer 117 is reduced when the swing width of the data voltage Vdata is small, the slew rate until the time when the data voltage Vdata charged to the pixel reaches the target voltage may not be reduced, and the power consumption may be reduced.

The bias current coordinator 520 may reduce the bias current flowing in the output buffer 117 when the swing width of the data voltage Vdata is relatively small. The slew rate of the data voltage Vdata, which is encountered when the swing width of the data voltage Vdata is small, may be controlled to be the same or similar to the slew rate of the data voltage Vdata when the swing width of the data voltage Vdata is small.

Figure 6:
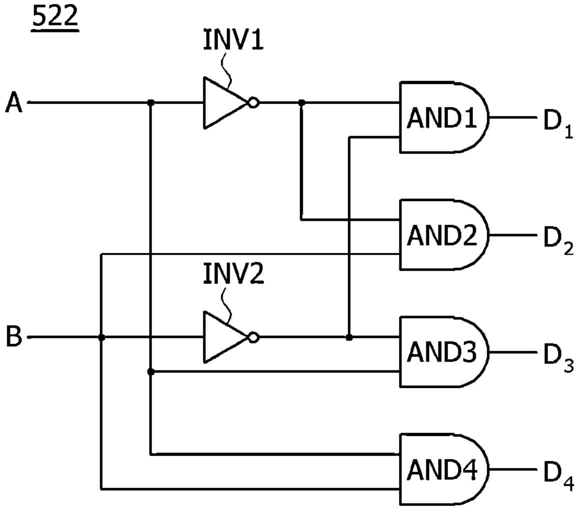
FIGS. 6 and 7 are circuit diagrams illustrating a grayscale difference-based bias current control circuit of a bias current coordinator according to one embodiment of the present disclosure.
Figure 7:
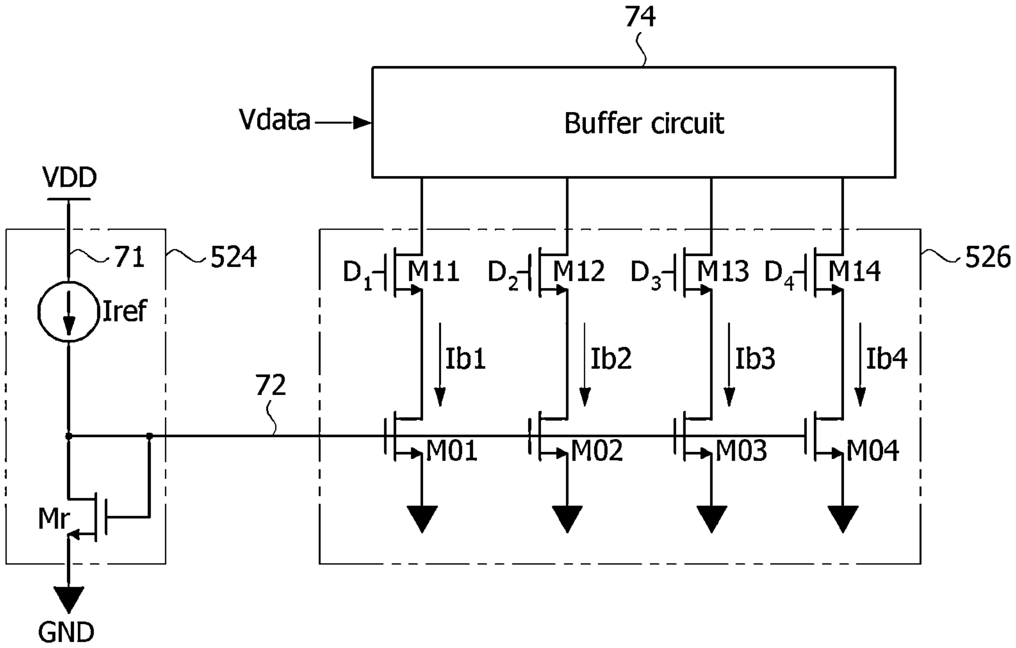

FIGS. 6 and 7 are circuit diagrams illustrating the bias current coordinator according to one embodiment of the present disclosure. In FIG. 6, the circuit diagram on the left is the circuit of the decoder, and the table on the right is the truth table of the decoder.

Referring to FIGS. 6 and 7, the bias current coordinator 520 may include a decoder 522, a reference current generator 524, and a current coordinator 526.

The data comparator 510 may output two bits A and B of grayscale difference data indicating the grayscale difference of the pixel data. For example, but not limited to, when the pixel data has a grayscale difference of 0 to 64 or less, the bits A and B of the grayscale difference data are denoted as AB=00, when the pixel data has a grayscale difference of 65 to 128, the bits A and B of the grayscale difference data are denoted as AB=01, when the pixel data has a grayscale difference of 129 to 192, the bits A and B of the grayscale difference data are denoted as AB=10, and when the pixel data has a grayscale difference of 193 to 255, the bits A and B of the grayscale difference data are denoted as AB=11. The decoder 522 may be, but is not limited to, a 2*4 decoder that receives 2 bits A and B of the grayscale difference data and outputs 4 bits of current control data, as shown in FIG. 6.

The 2*4 decoder may include first and second inverters INV1 and INV2, and first to fourth AND gates AND1 to AND4. The first inverter INV1 inverts a first input bit A and provides it to the first and second inverters INV1 and INV2. The second inverter INV2 inverts a second input bit B and provides it to the first and third inverters INV1 and INV3.

The first AND gate AND1 outputs the result of a logical AND operation of the inverted first input bit A and the inverted second input bit B. An output value D1 of the first AND gate AND1 is a logic high (high=1) when A=0 and B=0, and otherwise a logic low (low=0). The second AND gate AND2 outputs the result of a logical AND operation of the inverted first input bit A and the non-inverted second input bit B. An output value D2 of the second AND gate AND2 is a logic high (high=1) if A=0 and B=1, and otherwise a logic low (low=0). The third AND gate AND3 outputs the result of a logical AND operation of the non-inverted first input bit A and the inverted second input bit B. An output value D3 of the third AND gate AND3 is a logic high (high=1) if A=1 and B=0, and otherwise a logic low (low=0). The fourth AND gate AND4 outputs the result of a logical AND operation of the non-inverted first input bit A and the non-inverted second input bit B. An output value D4 of the fourth AND gate AND4 is a logic high (high=1) if A=1 and B=1, and otherwise a logic low (low=0).

The reference current generator 524 and the current coordinator 526 may constitute a current mirror circuit. The reference current generator 524 includes a constant current source and a reference transistor Mr disposed between a VDD node 71 and a gate node 72, to which a driving voltage VDD is applied, to generate a reference current Iref. The reference transistor Mr includes a first electrode connected to a GND node to which a ground voltage GND is applied, a gate electrode, and a second electrode connected to the gate node 72.

The current coordinator 526 may include a plurality of transistors M01 to M04 and M11 to M14 that selectively output bias currents having different current values derived from the reference current Iref. A channel ratio W/L of the transistors M01 to M04 and M11 to M14 may be set to the same as or different values from the channel ratio W/L of the reference transistor.

The first-first to first-fourth transistors M01 to M04 may generate bias currents Ib1 to Ib4 that are duplicated by the reference current Iref. The first-first transistor M01 includes a first electrode connected to the GND node, a gate electrode connected to the gate node 72, and a second electrode connected to a first electrode of the second-first transistor M11. The first-second transistor M02 includes a first electrode connected to the GND node, a gate electrode connected to the gate node 72, and a second electrode connected to a first electrode of the second-second transistor M12. The first-third transistor M03 includes a first electrode connected to the GND node, a gate electrode connected to the gate node 72, and a second electrode connected to a first electrode of the second-third transistor M13. The first-fourth transistor M04 includes a first electrode connected to the GND node, a gate electrode connected to the gate node 72, and a second electrode connected to a first electrode of the second-fourth transistor M14.

The second-first to second-fourth transistors M11 to M14 are connected between the first-first to first-fourth transistors M01 to M04 and the buffer circuit 74 to coordinate the bias currents Ib1 to Ib4 in response to the output data D1 to D4 of the decoder 522. The output data D1 to D4 from the decoder 522 may be multiplied by the position-based bias current value P.

The second-first transistor M11 may be turned on when the voltage of D1 is a gate-on voltage to allow the first bias current Ib1 to flow, while it may be turned off when the voltage of D1 is a the gate-off voltage. The second-first transistor M11 includes a first electrode connected to the second electrode of the first-first transistor M01, a gate electrode to which the voltage of D1 is applied, and a second electrode connected to the buffer circuit 74. The buffer circuit 74 outputs the data voltage Vdata output from the DAC 116 to the output terminal of the data driving part 110. The slew rate of the data voltage Vdata output from the buffer circuitry 74 may be controlled by the bias currents Ib1 to Ib4, which are varied, by the bias current coordinator 520, based on the pixel position and the grayscale difference data of the pixel data.

The second-second transistor M12 may be turned on when the voltage of D2 is the gate-on voltage to allow the second bias current Ib2 to flow, while it may be turned off when the voltage of D2 is the gate-off voltage. The second-second transistor M12 includes a first electrode connected to the second electrode of the first-second transistor M02, a gate electrode to which the voltage of D2 is applied, and a second electrode connected to the buffer circuit 74.

The second-third transistor M12 may be turned on when the voltage of D3 is the gate-on voltage to allow the third bias current Ib3 to flow, while it may be turned off when the voltage of D3 is at the gate-off voltage. The second-third transistor M13 includes a first electrode connected to the second electrode of the first-third transistor M03, a gate electrode to which the voltage of D3 is applied, and a second electrode connected to the buffer circuit 74.

The second-fourth transistor M14 may be turned on when the voltage of D4 is the gate-on voltage to allow the fourth bias current Ib4 to flow, while it may be turned off when the voltage of D4 is the gate-off voltage. The second-fourth transistor M14 includes a first electrode connected to the second electrode of the first-to-fourth transistor M04, a gate electrode to which the voltage of D4 is applied, and a second electrode connected to the buffer circuit 74.

As described above, the values of the output data D1 to D4 from the decoder 522 may be determined according to the grayscale difference between the pixel data, and the current value may be selected according to the output data D1 to D4, thereby causing the bias current to be varied. The slew rate of the data voltage Vdata output from the buffer circuit 74 decreases as the bias current becomes lowered, while the slew rate of the data voltage Vdata output from the buffer circuit 74 increases as the bias current becomes higher.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A data driver comprising:

an output buffer configured to output a data voltage corresponding to pixel data; and a bias current coordinator configured to coordinate a bias current applied to the output buffer according to a final bias current value obtained by multiplying a default current value by a position-based bias current value and a grayscale difference-based bias current value, wherein the default current value is applied to all pixels at the same value, the position-based bias current value is varied with a distance between the data driver and a position of pixels, and the grayscale difference-based bias current value is varied with a grayscale difference of the pixel data, and wherein the position of the pixels is based on counting timing signals or counting grayscale difference data input.

2. The data driver of claim 1, further comprising:

a data comparator configured to compare the grayscale difference of the pixel data that is varied with time, wherein the bias current coordinator is configured to vary the bias current based on the grayscale difference data input from the data comparator.

3. The data driver of claim 2, wherein the bias current becomes smaller when the pixel data has a small change in a grayscale value than when the pixel data has a large change in the grayscale value.

4. The data driver of claim 2, wherein the bias current coordinator is configured to gradually or stepwise increase the bias current as time elapses during one frame period.

5. The data driver of claim 1, further comprising:

a logic controller configured to set the bias current in a unit of a frame period in response to option data received from outside the data driver.

6. A data driver comprising:

a first latch array configured to latch pixel data;

a second latch array configured to latch pixel data output from the first latch array;

a digital-to-analog converter configured to convert the pixel data output from the second latch array to a data voltage;

an output buffer configured to output the data voltage from the digital-to-analog converter;

a data comparator connected to the first latch array and the second latch array and configured to compare first pixel data stored in the first latch array and second pixel data stored in the second latch array; and a bias current coordinator connected between the data comparator and the output buffer and configured to vary a bias current applied to the output buffer according to a final bias current value obtained by multiplying a default current value by a position-based bias current value and a grayscale difference-based bias current value, wherein the default current value is applied to all pixels at the same value, the position-based bias current value is varied with a distance between the data driver and a position of pixels, and the grayscale difference-based bias current value is varied with a grayscale difference of the pixel data, and wherein the position of the pixels is based on counting timing signals or counting grayscale difference data input.

7. The data driver of claim 6, wherein:

the first pixel data is the pixel data to be written to pixels of an (N+1)th pixel line (N is a natural number), and the second pixel data is the pixel data to be written to pixels of an (N)th pixel line, and the data comparator is configured to compare two most significant bits of the first pixel data with two most significant bits of the second pixel data to output grayscale difference data indicating an amount of change in grayscale between the first pixel data and the second pixel data.

8. The data driver of claim 7, wherein the bias current coordinator is configured to vary the bias current in response to the grayscale difference data.

9. The data driver of claim 7, wherein the bias current coordinator is configured to vary the bias current based on the grayscale difference of the pixel data.

10. The data driver of claim 6, further comprising:

a logic controller; and a shift register configured to output pixel data input from the logic controller to latches in the first latch array.

11. The data driver of claim 10, wherein the logic controller is configured to set the bias current in a unit of a frame period in response to option data received from outside the data driver.

12. The data driver of claim 7, wherein the bias current coordinator includes:

a decoder configured to receive the grayscale difference data to output current control data;

a reference current generator configured to generate a reference current; and a current coordinator connected to the reference current generator to form a current mirror circuit.

13. The data driver of claim 12, wherein the reference current generator includes:

a constant current source disposed between a VDD node to which a driving voltage is applied and a gate node and configured to generate the reference current; and a reference transistor including a first electrode connected to a GND node to which a ground voltage is applied, and a gate electrode and a second electrode connected to the gate node, and wherein the current coordinator includes:

a plurality of transistors configured to output the bias current having different current values derived from the reference current.

14. The data driver of claim 13, wherein the current coordinator includes:

a plurality of first transistors having gate electrodes connected to the gate node; and a plurality of second transistors connected between the plurality of first transistors and the output buffer, and configured to coordinate the bias current in response to output data from the decoder.

15. The data driver of claim 12, wherein a value of output data from the decoder is determined according to the grayscale difference between the first pixel data and the second pixel data, and wherein the bias current is varied by selecting current values according to the output data.

16. The data driver of claim 15, wherein:

as the bias current becomes lower, a slew rate of data voltage output through the output buffer becomes lower, and as the bias current becomes higher, the slew rate of the data voltage output through the output buffer becomes higher.

17. A control method of a data driver comprising:

judging a position-based bias current value configured to be varied with a distance between a data driver and a position of pixels to which pixel data is written;

judging a grayscale difference-based bias current value configured to be varied with a grayscale difference of the pixel data;

determining a final bias current value by multiplying a default current value by the position-based bias current value and the grayscale difference-based bias current value; and varying a bias current to an output buffer from which a data voltage corresponding to the pixel data is output according to the final bias current value, wherein the position of the pixels is based on counting timing signals or counting grayscale difference data input.

18. The control method of claim 17, further comprising:

determining the position-based bias current value according to the position of pixels, regardless of a grayscale difference of the pixel data; and determining the grayscale difference-based bias current value based on the grayscale difference of the pixel data indicative of an amount of change in grayscale of the pixel data.

19. The control method of claim 18, further comprising:

receiving control data including option information, wherein the default current value is determined according to the option information.

* * * * *